UNITED STATES PATENT OFFICE.

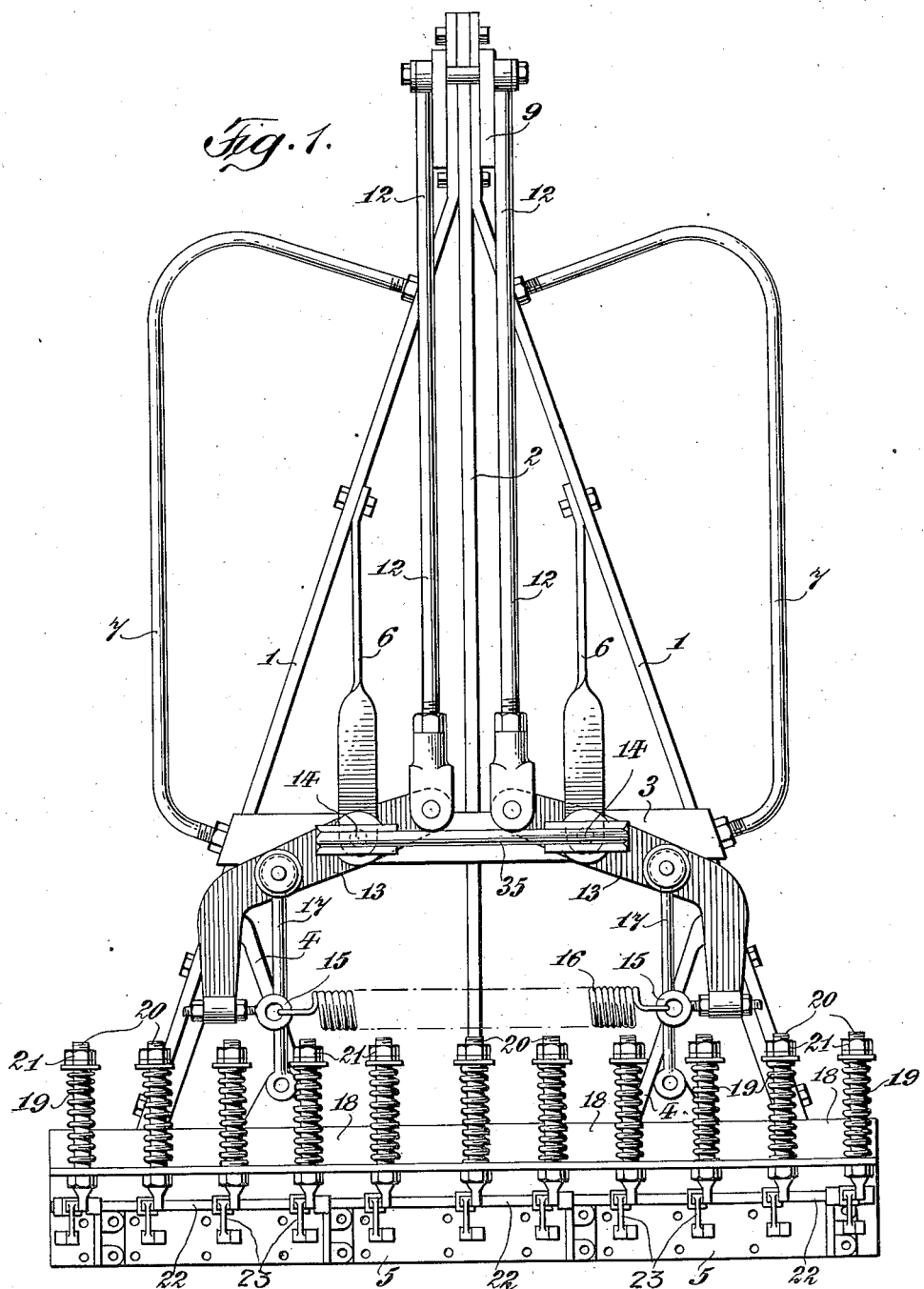

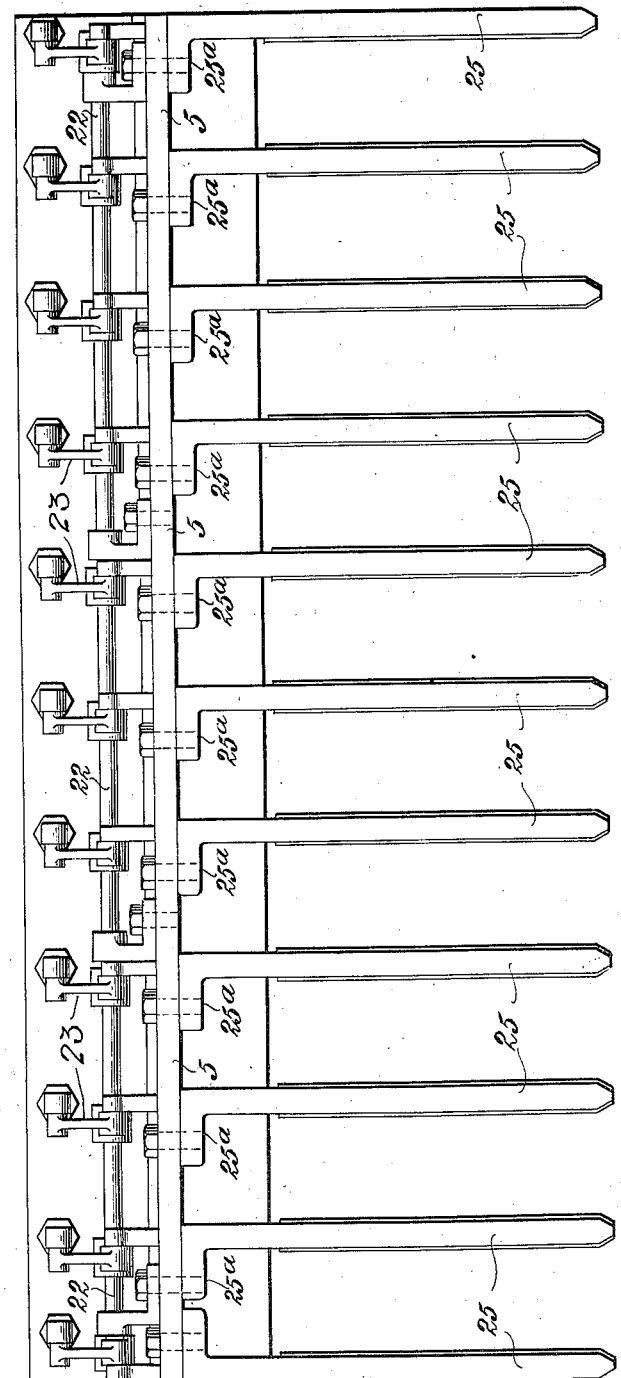

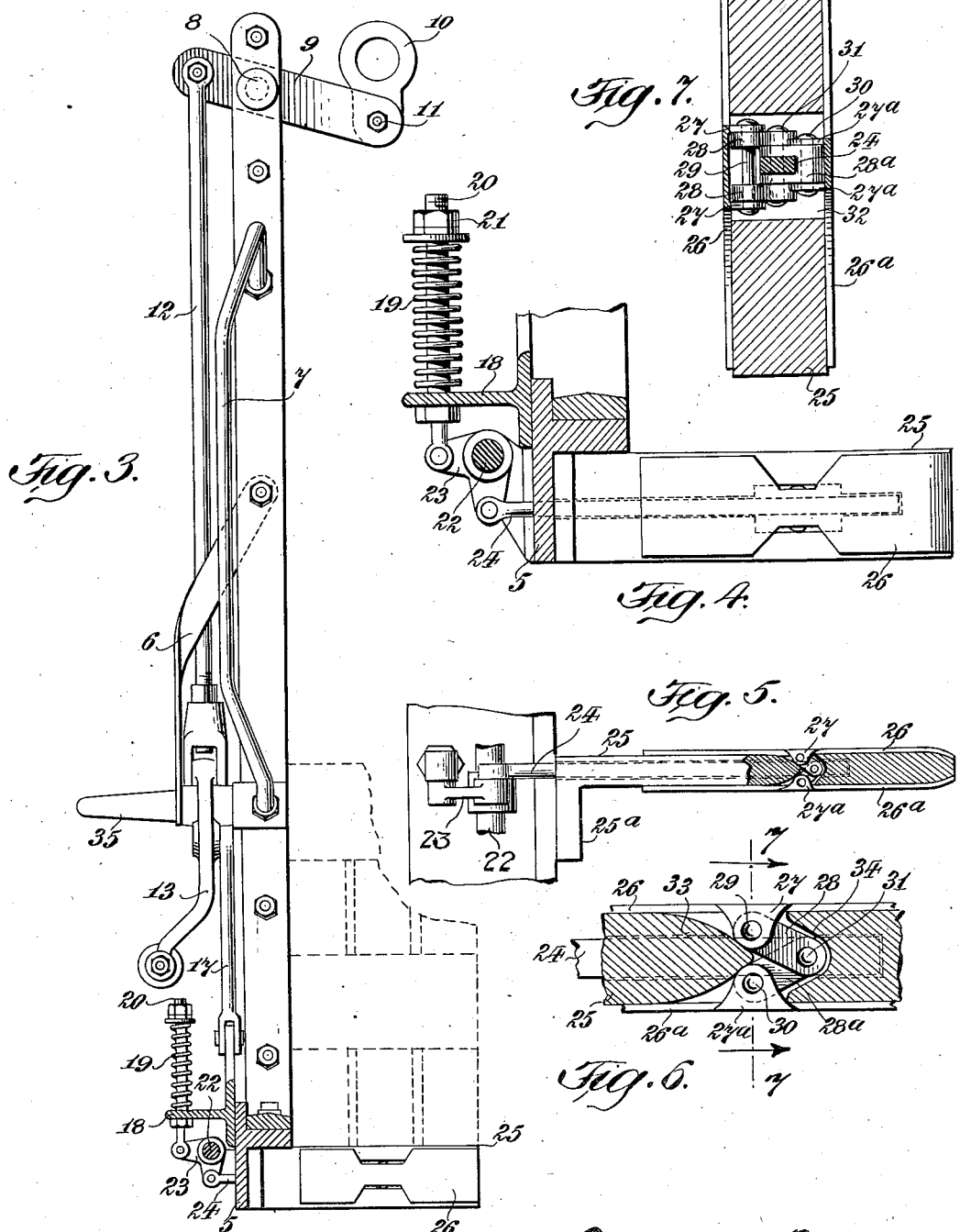

EDWARD J. FRITSCH, OF WILLOUGHBY, OHIO, ASSIGNOR TO THE AMERICAN CLAY MACHINERY COMPANY, OF BUCYRUS, OHIO, A CORPORATION OF OHIO.

MACHINE FOR HANDLING BRICKS.

956,330.  Specification of Letters Patent.  Patented Apr. 26, 1910.

Application filed October 13, 1908. Serial No. 457,571.

*To all whom it may concern:*

Be it known that I, EDWARD J. FRITSCH, a citizen of the United States of America, residing at Willoughby, in the county of Lake and State of Ohio, have invented certain new and useful Improvements in Machines for Handling Bricks, of which the following is a specification, reference being had therein to the accompanying drawing.

This invention relates to a machine for handling bricks, the same belonging to the general class wherein a lifting device engages the base of a pile of bricks stacked up in conformity with a pre-arranged plan and with uniform spaces between the units of the basic layer, into which spaces fingers or clamps may be projected.

Examples of machines of this class are seen in the Letters Patent for brick handling machines, No. 859,445, dated July 9, 1907, granted to William Henry Francis; the Letters Patent granted to William Henry and Charles Francis, for a brick handling machine, No. 859,586, dated June 9, 1908, and in my co-pending application for Letters Patent on brick handling machine, filed October 15, 1908, Serial Number 457,840. The method practiced in the mechanism in these various patents and in the application is itself covered in Letters Patent No. 874,582, of William Henry Francis, dated December 24, 1907, and relates to the handling of brick in bulk so that they may be transported to any desired point without breaking the bulk. According to this method the bricks are hacked up in rectangular formation with uniform openings between the bricks of the basic layer to permit the lifting arms of the machine to enter these spaces to carry the superposed load; while the basic layer is itself picked up and carried along with the superincumbent mass by means of a horizontal gripping action caused by clamping devices arranged in connection with the lifting arms.

The object of the present invention is to provide simple, economical and efficient means for practicing the same method and the invention consists in useful and novel means for gripping or clamping the members of the basic layer of such a bulk or mass of bricks, and especially in gripping means automatically adjustable to irregularities in the surface, the thickness, or other dimensions of the bricks, and further in numerous details and peculiarities in the construction and combination of parts, substantially as will be hereinafter set forth and claimed.

In the accompanying drawings illustrating my invention, Figure 1 is a front elevation of the entire machine. Fig. 2 is a bottom plan view of the clamping mechanism, the vertical frame being removed. Fig. 3 is a side elevation in partial section. Fig. 4 is a sectional enlarged detail view, showing one of the fixed plates and one of the movable clamping plates on one side thereof, together with means for actuating both the clamping plates on opposite sides of a fixed plate. Fig. 5 is a bottom sectional plan view of the same. Fig. 6 is an enlarged detail sectional view of the fixed plate, the clamping plates, and the toggle mechanism for operating the latter. Fig. 7 is an enlarged sectional view on the line 7, 7 of Fig. 6, certain parts being in elevation.

Similar characters of reference designate corresponding parts throughout the different figures of the drawings.

In Fig. 3, I have represented in dotted lines a stack of bricks with which my improved brick handling machine is designed to operate. The bricks of the stack are piled so that the members of the basic layer are spaced apart a uniform distance, say about an inch or an inch and a half. Into the several spaces between the members or units of the basic layer project a plurality of lifting arms 25 which consist of vertically arranged plates having at the rear end an angular part 25ᵃ which is securely bolted or otherwise attached to the base bar 5 of the main frame of the machine. Each of the lifting bars 25 is provided with a pair of clamping members pivotally supported at their centers on opposite sides of the lifting bar 25 and adapted to be moved a greater or less distance away from the lifting bar 25, the arrangement and operation of which clamping plates will be hereinafter fully set forth. The series of projecting lifting arms is clearly shown in Fig. 2, and the manner in which they are extended between the members of the basic layer, so as to act under the superincumbent mass is fully indicated in Fig. 3.

The vertical main frame of the machine to which belongs the base bar 5 that carries secured thereto the series of horizontal lifting arms 25 may vary in a great variety of ways, and hence I expressly reserve the liberty of reconstructing and modifying the construction and arrangement of the frame within very wide limits. The specimen of the frame shown in the drawings, one which is found to be useful and sufficient for the purpose, comprises essentially two inclined bars 1, 1, a central vertical bar 2, to which the inclined bars are bolted near their upper ends, vertical straps 6, which are bolted to the inclined bars 1, 1, a transverse and horizontal bar 3, which is secured to the inclined bars 1, 1 at about midway of their height, and two triangular base frames 4, which are bolted to the inclined bars 1 and also to the base bar 5. Thus all these parts are rigidly bolted together to form a unitary structure. Fastened to the side bars 1 are two upwardly extending lateral handles or loops 7 which are used for the purpose of manipulating the machine when it is being moved about. At the apex of the triangular frame thus constructed, there is a short lever or pair of levers 9 pivoted upon a horizontal bolt 8 which passes through the upper end of the frame. Lever 9 is provided on its long end with an eye 10 pivoted thereto by means of a bolt 11, said eye being for the purpose of receiving the hook or other connection belonging to a traveling crane, hoisting machine, or the like. The other or short end of the lever 9 is pivoted to a vertical link 12, of which there are two, which pass downwardly alongside of the main frame and are designed to have the function of thrusting bars. The lower ends of the links 12 are pivoted to the inner arms of two elbow levers 13 which are fulcrumed upon bolts 14 passing through the cross bar 3 and also through the vertical straps 6 hereinabove alluded to. The lower members of the elbow levers 13 are provided with eye-bolts 15, to which are connected the opposite ends of a horizontal spiral tension spring 16 which serves as a balancing device. At a point between the fulcrum 14 of each of the elbow levers 13 and its eye-bolt 15, there is pivotally connected a short vertical lifting rod 17. The two lifting rods 17 are bolted to a lift bar 18 and operate to lift the latter when the machine is in operation. The lifting strain on the bar 18 is applied to a series of coiled springs 19 which surround vertical stems 20 and bear at their upper ends against washers and nuts 21 on said stems 20. The stems 20 pass downwardly through the bar 18. A handle 35, consisting of a suitable loop, is attached to the front of the frame by being connected to the horizontal bar 3 where the fulcrum bolts 14 are located, which bar 35 assists in manipulating the machine.

The lower ends of the various stems 20, which project downwardly through the lifting bar 18, are pivotally connected to the upper arms of small bell crank levers 23 which are fulcrumed on a horizontal rod 22 supported in suitable bearings on the front of the base bar 5; while the downwardly projecting arms of these bell crank levers 23 are pivotally connected to the ends of horizontal bars 24 which pass through suitable openings in the base bar 5 and operate in passages within the fixed horizontal lifting bars 25, as clearly shown in Figs. 4, 5, 6 and 7.

On each side of each of the fixed horizontal lifting bars 25 is a movable clamping plate. I have designated the two clamping plates of one pair as they are shown in Figs. 5 and 6 as 26 and 26$^a$. At the middle point of the length of each of the clamping plates 26 and 26$^a$ the material thereof is cut away and folded over to provide horizontal ears 27 and 27$^a$ between which are pivoted the links or toggle levers 28, 28$^a$ which are likewise pivoted to each other and to the horizontal bar 24. The detailed construction and arrangement of the pivotal points and the toggle devices is best shown perhaps in Fig. 7, where it is seen that one of the clamping plates of the pair, as, for instance, the plate 26, has its pair of horizontal clamping ears 27 sufficiently far apart to permit two toggle levers 28 to be pivoted between them by means of a pivot pin 29. These two toggle levers 28, the upper end the lower, receive between them a single toggle lever 28$^a$, one end of which is pivoted between the ears 27$^a$ formed on the clamping plate 26$^a$, the pivoting being by means of a bolt or pin 30. Furthermore, the other end of the toggle 28$^a$ is pivoted to and between the pair of toggles 28, 28 by means of a pin 31, and said pin also passes through the horizontal bar 24 so that the toggle device is pivoted to said bar, as shown in Figs. 6 and 7. The lifting bar 25 is not only provided with a longitudinal passage through which the bar 24 reciprocates when actuated by means of the bell crank lever 23; but it is also formed at a certain point with a lateral opening 32 which receives the inwardly projecting ears 27 and 27$^a$, and accommodates the toggle devices 28 and 28$^a$. The first bar 25 is shaped interiorly near this opening 32 with a pointed cam-shaped member 33 which projects between the links 28 and 28$^a$, and also with a curved recess or concavity 34 opposite the cam point 33, into which recess the links 28 and 28$^a$ can withdraw themselves when the clamping plates 26 and 26$^a$ are drawn close up against the sides of the fixed lifting bar 25. Assuming that the movable bar 24 is reciprocated in both directions at different times for the purpose of applying the clamp and also for relieving it, the course of the operation will easily be seen from the foregoing description of the parts. It will be evident that when the bar 24 is drawn in one direction, the toggles 28 and 28ª will be spread apart by the forcing thereof which will occur, which forcing will tend to draw them at both sides of the cam point 33 (see Fig. 6) and this will result in spreading the clamping plates 26 and 26ª away from each other and away from the sides of the lifting bar 25. Conversely when the bar 24 reciprocates in the opposite direction, the toggles 28 and 28ª will be drawn away from the cam point 33 and delivered into the base of the concavity 34, thereby pulling the clamping members 26 and 26ª tightly against the outside faces of the lifting bar 25. As the clamping plates 26 and 26ª are pivotally hung at their centers, it is manifest that their ends are free to adjust themselves to any irregularities and inequalities in the thickness of the bricks against which they are in contact, and consequently bricks which are somewhat thinner at one end than at the other will be gripped just as tight as bricks which are uniformly thick throughout.

The operation of the machine will be evident from the foregoing description of the construction and arrangement of the various parts. After it has been located in proximity to a mass of brick previously set with the basic layer properly spaced apart to accommodate the lifting bars or fingers, the latter will be inserted in the spaces between the bricks, and then a derrick or hoisting mechanism which connects with the eye 10 at the top of the frame will lift the machine and the entire mass of brick. The initial lifting movement imparted to the machine through the lever 9 impresses the thrust bars 12, vibrates the elbow levers 13, and lifts the bar 18, thereby oscillating the various bell cranks 23 to which the stems 20 are connected and moving the rods or bars 24 endwise, the result of which is to spread the clamps 26 and 26ª at the opposite sides of the lifting bars 25. Thus the initial lifting movement of the machine actuates the clamping mechanism. As the machine lifts it is obvious that the bars 25 raise the superposed mass simultaneously with the clamping action upon the bricks of the lower layer, and that said clamping action is automatically accomplished in the manner I have specified.

Various changes in the exact construction and arrangement of the mechanical details may be made to adapt the machine to the needs of individual cases without departing from the scope of the claims.

Having thus described my invention, what I claim as new and desire to secure by Letters Patent, is:

1. In a machine for handling bricks, the combination of a vertical frame, a series of lifting bars at the base thereof, pairs of clamping plates pivotally supported in connection with each lifting bar, and means for actuating said clamps.

2. A machine for handling bricks, comprising a frame, and pairs of movable pivotally supported clamping devices at the base thereof adapted to be inserted between adjacent bricks, each brick being held by the clamping action of two movable plates, and means for actuating said clamping devices.

3. A machine for handling bricks, comprising a vertically disposed frame, a series of lifting bars at the base thereof, a pair of movable clamps for each lifting bar, one member of each pair being pivotally supported at each side of said lifting bar, and a lever mechanism for laterally moving the clamping plates.

4. A machine for handling bricks, comprising a supporting frame, pairs of laterally movable clamping plates, means for pivotally supporting said plates near the base of the frame, and means for moving the clamping plates so that each brick may be held between two movable members.

5. A machine for handling bricks, comprising a supporting frame, a plurality of pairs of movable clamping plates at the base thereof adapted to be inserted between adjacent bricks, and means for pivotally supporting said clamping plates and for simultaneously moving both members of a pair.

6. A machine for handling bricks, comprising a vertical frame, a series of lifting devices carried at the lower end thereof, a plurality of pairs of laterally movable clamping plates arranged in connection with the lifting devices so that two clamping plates are carried by each lifting device, a reciprocating bar for actuating the clamping plates, and interpivoted levers connected to the bar and the clamping plates.

7. A machine for handling bricks, comprising a vertically disposed frame, a series of lifting devices carried by the lower end thereof, a pair of clamping plates arranged with its members on opposite sides of each lifting bar, reciprocating means for actuating the clamping plates, and toggle devices connecting said reciprocating means with the clamping plates, together with means whereby the initial lifting movement of the frame actuates the reciprocating means and operates the clamping plates.

8. A machine for handling bricks, comprising a vertically disposed frame, lifting bars carried thereby, pairs of clamping plates arranged in connection with the lifting bars, levers pivoted to each other and to the clamping plates, a reciprocating bar to which the said levers are pivoted, and a relatively stationary cam for spreading the levers and the clamping plates during the clamping action.

9. A machine for handling bricks, comprising a vertically disposed frame, a series of lifting bars at the base thereof, pairs of laterally-movable centrally-supported clamping plates on opposite sides of each lifting bar, toggle devices for actuating the clamping plates, a relatively stationary cam against which the toggles work, and means whereby the initial lifting movement of the machine will operate the clamping plates, and cause them to clamp the bricks.

10. A machine for handling bricks, comprising a vertically disposed frame, a plurality of lifting bars at the base thereof, clamping plates on the opposite sides of each lifting bar, means located within the lifting bar and consisting of interpivoted levers which are likewise pivoted to the clamping plates for centrally supporting the latter, a reciprocating bar within the lifting bar to which said levers are pivoted, a stationary cam device likewise inside the lifting bar and a recess opposite to the latter, said cam and recess coöperating with the levers in their action.

11. A machine for handling bricks, comprising a vertically disposed frame, a series of lifting bars arranged near the base thereof, laterally movable clamping plates on opposite sides of each lifting bar, means for supporting said plates centrally so that the ends may be free to adjust themselves, reciprocating bars for actuating said clamping plates, a series of bell crank levers operating said reciprocating bars, and means whereby the initial lifting movement of the machine will vibrate the bell cranks and cause the clamping plates to be actuated, said means including a series of springs for giving an elastic effect to the operation.

12. A machine for handling bricks, comprising a frame, a series of lifting bars at the base thereof, pairs of clamping plates pivotally supported at the sides of each lifting bar, a reciprocating bar operating to cause the clamping plates to exert a clamping effect, and means for actuating said reciprocating bar.

13. A machine for handling bricks, comprising a frame, a series of lifting bars at the base thereof, pairs of clamping plates pivotally supported in connection with said bars centrally of the length of the latter and adapted to be laterally movable, and means for moving said plates to cause them to exert a clamping effect.

14. A machine for handling bricks, comprising a frame, a series of lifting bars at the base thereof, clamping plates arranged in connection with the lifting bars, toggle devices for actuating the clamping plates, a stationary cam against which the toggles work, and reciprocating bars carrying the toggles.

15. A machine for handling bricks, comprising a vertical frame, a series of lifting bars at the base thereof, clamping plates arranged in connection with the lifting bars, toggles for actuating the clamping plates, and reciprocating bars by which the toggles are carried.

16. A machine for handling bricks, comprising a frame, a series of lifting bars at the base thereof, movable clamping devices, arranged in connection with the lifting bars, levers pivoted to the clamping plates intermediate of their ends, the said levers being pivoted to each other, a stationary cam within each lifting bar, and means for moving the interpivoted levers against and away from the cam.

In testimony whereof I affix my signature in presence of two witnesses.

EDWARD J. FRITSCH.

Witnesses:
 FRANK PAUL,
 C. B. SCHROEDER.